(12) United States Patent
Morishita et al.

(10) Patent No.: US 7,337,867 B2
(45) Date of Patent: Mar. 4, 2008

(54) VEHICLE-PEDAL BACKWARD-DISPLACEMENT PREVENTING DEVICE

(75) Inventors: Tsuyoshi Morishita, Toyota (JP); Hikaru Sugiura, Toyota (JP); Junji Adachi, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 434 days.

(21) Appl. No.: 10/998,971

(22) Filed: Nov. 30, 2004

(65) Prior Publication Data

US 2006/0102412 A1 May 18, 2006

(30) Foreign Application Priority Data

Nov. 18, 2004 (JP) ............................. 2004-334570

(51) Int. Cl.
*B60K 28/10* (2006.01)
(52) U.S. Cl. ..................................... 180/274
(58) Field of Classification Search ............... 180/274, 180/275; 74/512, 513, 560
See application file for complete search history.

(56) References Cited

U.S. PATENT DOCUMENTS

| 5,996,440 | A | 12/1999 | Nawata et al. | |
| 6,279,417 | B1* | 8/2001 | Mizuma et al. | 74/512 |
| 6,339,971 | B1 | 1/2002 | Kato | |

FOREIGN PATENT DOCUMENTS

| EP | 0 803 420 A2 | 10/1997 |
|---|---|---|
| JP | A-H9-123948 | 5/1997 |
| JP | A-H09-254821 | 9/1997 |
| JP | A-H10-175492 | 6/1998 |
| JP | A-H10-297400 | 11/1998 |
| JP | A-H11-291944 | 10/1999 |
| JP | 2000-163146 | 6/2000 |

* cited by examiner

*Primary Examiner*—Faye M. Fleming
(74) *Attorney, Agent, or Firm*—Finnegan, Henderson, Farabow, Garrett & Dunner, LLP

(57) ABSTRACT

A vehicle-pedal backward-displacement preventing device. A pedal bracket has side plates each including a front end at which the pedal bracket is attached to the dash pane. A bulge protrudes in a protruding direction away from the other of the side plates. An operating pedal having a depressible portion is provided by its lower end portion. A guide member is associated with an upper end portion of the pedal bracket and a vehicle body member. The guide member causes the upper end portion of the pedal bracket to be downwardly displaced, upon displacement of the pedal bracket, whereby the pedal bracket is deformed with the side plates being made to buckle, so as to restrain the displacement of the depressible portion of the operating pedal toward a driver's seat. Each side plate has an aperture located in its region which includes a crest portion of the bulge, such that a strength of each side plate against a load is reduced most in the crest portion. Each side plate therefore can be made to buckle with the crest portion being displaced in the protruding direction.

8 Claims, 3 Drawing Sheets

VEHICLE-PEDAL BACKWARD-DISPLACEMENT PREVENTING DEVICE

TECHNICAL FIELD OF INVENTION

The present invention relates to a vehicle-pedal backward-displacement preventing device for preventing a depressible portion of an operating pedal from being backwardly displaced toward a driver's seat in the event of displacement of a dash panel toward the driver's seat.

BACKGROUND ART

There is proposed a vehicle-pedal backward-displacement preventing device having: (a) a pedal bracket provided with a pair of side plates each including a front end at which the pedal bracket is fixedly attached to a dash panel; (b) an operating pedal disposed pivotably about an axis of a support shaft connecting the pair of side plates, and having in its lower end portion a depressible portion which is to be depressed whereby the operating pedal is operated; (c) a guide member disposed in relation to an upper end portion of the pedal bracket and a vehicle body member, and restraining the depressible portion of the operating pedal from being backwardly displaced toward a driver's seat, upon backward displacement of the pedal bracket together with the dash panel toward the driver's seat. The guide member causes the upper end portion of the pedal bracket to be downwardly displaced following a predetermined displacement path, as a result of displacement of the pedal bracket relative to the vehicle body member, whereby the pedal bracket is deformed to be bent with the pair of side plates being made to buckle, so as to restrain the backward displacement of the depressible portion of the operating pedal toward the driver's seat.

As an example of the above-described device, Patent Document 1 discloses a brake-pedal backward-displacement preventing device in which the pedal bracket is connected at its upper end portion with the guide member (slide plate) that is fixed to an instrument panel reinforcement member as the vehicle body member. In the event of displacement of the dash panel toward the driver's seat which displacement is caused, for example, with an impact of a large load to the dash panel in a direction from the vehicle front to the rear, the pedal bracket is disconnected from the guide member, and the upper end portion of the disconnected pedal bracket is guided by the guide member so as to be downwardly displaced. As a result of the downward displacement of the upper end portion of the pedal bracket, the pedal bracket is made to buckle. In this instance, the pedal bracket is deformed to be bent at its portion in which an aperture is formed for reducing a rigidity of the pedal bracket, whereby the brake pedal as the operating pedal is pivoted about a fulcrum provided by its connected portion at which the brake pedal is connected to an operating rod. The brake pedal is thus pivoted about its connected portion as the fulcrum such that its depressible portion is relatively displaced toward the front of the vehicle. Patent Document 2 also discloses a pedal backward-displacement preventing device having substantially the same construction as the device disclosed in the Patent Document 1.

[Patent Document 1] JP-A-H10-175492

[Patent Document 2] JP-A-H9-254821

DISCLOSURE OF INVENTION

OBJECT TO BE ACHIEVED BY INVENTION

There is a case where each of the pair of side plates of the pedal bracket is designed to have a bulge which protrudes to be curved outwardly, for example, for avoiding interference of the side plate with a brake booster. However, when the thus designed pedal bracket is deformed to be bent, a boundary portion (bent portion) of the bulge could be inwardly displaced by a load exerted by the above-described guide member, depending upon position and shape of the aperture.

A pedal bracket 100 of FIGS. 3 (a) and 3 (b) includes a back plate 106 and a pair of side plates 102, 104 which are connected to each other through the back plate 106. Thus, the pedal bracket 100 has a U-shaped cross sectional shape as a whole. The side plates 102, 104 have, in their lower portions, respective bulges 102a, 104a which protrude to be curved outwardly, so as not to interfere with a brake booster. The pedal bracket 100 is fixedly attached at front ends of the respective bulges 102a, 104a (at left ends of the respective bulges 102a, 104a as seen FIG. 3 (a)), to a dash panel 108. A support shaft 110 is provided to connect upper portions of the side plates 102, 104, so that an operating pedal (not shown) can be pivotably attached to the support shaft 110. An aperture 112 is formed in the vicinity of each of the bulges 102a, 104a, for reducing weight of the pedal bracket 100. In each of upper boundary portions 102b, 104b of the respective bulges 102a, 104a, there is located a weakest portion Q in which a strength against a load F exerted by a guide member (not shown) upon backward displacement of the dash panel 108 (upon rightward displacement of the dash panel 108 as seen FIG. 3 (b)), is reduced most. Since the upper boundary portions 102b, 104b of the bulges 102a, 104a are bent to be relatively convexed inwardly, the portions 102b, 104b are displaced inwardly as indicated by broken lines in FIG. 3 (b), when the pedal bracket 100 is made to buckle with an impact of the compressive load F thereto. Even where the aperture 112 is located in a region of each of the side plates 102, 104 which region includes a crest portion of the bulge 102a, 104a, the strength against the above-described load F is reduced in the upper boundary portions 102b, 104b, as long as the aperture 112 having, for example, an oval shape lies across the upper boundary portion 102b, 104b. If the aperture 112 were formed within each of the bulges 102a, 104a so as not to lie across the upper boundary portion 102b, 104b, the thus formed aperture 112 could not contribute to sufficiently reduce the weight of the pedal bracket 100. It is noted that FIG. 3 (a) is a longitudinal cross sectional view of the pedal bracket 100, showing the right side plate 104 as seen from an inside of the pedal bracket 100, while FIG. 3 (b) is a front view of the pedal bracket 100.

If each of the side plates has a portion which is inwardly displaced upon buckling of the pedal bracket, there is a possibility that the device becomes incapable of sufficiently restraining backward displacement of the depressible portion of the operating pedal toward the driver's seat. This is because the inwardly displaced portion of the side plate could interfere with the brake booster or other object, whereby the bending deformation of the pedal bracket could be impeded.

The present invention was made under the above-described background with object of enabling the pedal bracket to appropriately buckle such that each of the side plates to be deformed in its outward direction, so as to further reliably provide the effect of restraining backward displacement of the operating pedal.

MEASUREMENT FOR ACHIEVING OBJECT

For achieving the above object, the first invention is, in a vehicle-pedal backward-displacement preventing device having (a) a pedal bracket provided with a pair of side plates each including a front end at which the pedal bracket is fixedly attached to a dash panel, and a bulge which protrudes to be curved outwardly, (b) an operating pedal disposed pivotably about an axis of a support shaft connecting the pair of side plates, and having a depressible portion which is provided by its lower end portion and which is to be depressed whereby the operating pedal is operated, and (c) a guide member disposed in relation to an upper end portion of the pedal bracket and a vehicle body member, and restraining the depressible portion of the operating pedal from being backwardly displaced toward a driver's seat, upon backward displacement of the pedal bracket together with the dash panel toward the driver's seat, the guide member causing the upper end portion of the pedal bracket to be downwardly displaced following a predetermined displacement path, as a result of displacement of the pedal bracket relative to the vehicle body member, whereby the pedal bracket is deformed to be bent with the pair of side plates being made to buckle, so as to restrain the backward displacement of the depressible portion of the operating pedal toward the driver's seat, characterized in that (d) each of the side plates has an aperture located in a region thereof which includes a crest portion of the bulge, such that a strength of each of the side plates against a load, which is exerted by the guide member upon the backward displacement of the dash panel, is weakened most in the crest portion, so that each of the side plates can be made to buckle with the crest portion of the bulge being made to protrude outwardly.

It is preferable that the depressible portion of the operating pedal is restrained from being backwardly displaced in the event of deformation of the dash panel, so as to be positioned in a position which is substantially the same as an original position of the depressible portion or which is located on the front side of the original position of the depressible portion. However, the depressible portion may be backwardly displaced toward the driver's seat (toward the rear of the vehicle), as long as an amount of the backward displacement of the depressible portion toward the driver's seat is reduced as a result of application of the present invention.

The second invention is, in the vehicle-pedal backward-displacement preventing device of the first invention, characterized in that (a) the operating pedal is a brake pedal connected to an operating rod of a brake booster which is disposed on the dash panel, (b) the side plates are disposed on respective right and left sides of the brake booster and extend upwardly, the bulges are provided in lower portions of the respective side plates and protrude in respective rightward and leftward directions along an outer periphery of the brake booster, for preventing interference of the side plates with the brake booster, each of the bulges has a front end which is attached to the dash panel, each of the bulges has a rear end which is rearwardly inclined with respect to the dash panel such that a distance between the dash panel and the rear end is increased as the rear end extends upwardly, and (c) the aperture extends to bridge the bulge and a portion of the side plate which is located on an upper side of the bulge, the aperture is provided by a triangular-shaped aperture such that a base of the triangle is located along the dash panel and such that a height of the triangle is increased most in an upper boundary portion of the bulge.

The third invention is, in the vehicle-pedal backward-displacement preventing device of the second invention, characterized in that the base of the triangle vertically extends to lie across the crest portion of the bulge and the upper boundary portion of the bulge.

The shape of the triangular-shaped aperture does not have to be defined necessarily by an accurate triangle. Rather, each of three vertexes of the triangle defining the aperture is preferably rounded. Further, the triangular-shaped aperture may be defined by a somewhat deformed triangle, which used to be a substantially accurate triangle in a state before formation of the bulge in a material providing each side plate (namely, which appears to be a substantially accurate triangle in an unfolded state), and which was posteriorly somewhat deformed as a result of the formation of the bulge. Off course, the aperture can be formed to have an accurately triangular shape in an eventual product state. In any case, the triangular-shaped aperture does not have to be necessarily given an accurately triangular shape, but may be given a generally triangular shape as long as the aperture provides an expected effect.

EFFECT OF INVENTION

In the vehicle-pedal backward-displacement preventing device as described above, the aperture is provided in the region of each side plate in which the bulge is provided, such that the strength of each side plate is weakened most in the crest portion of the bulge. Therefore, each side plate buckles with the crest portion of the bulge being made to protrude outwardly in the event of bending deformation of the pedal bracket, thereby enabling the pedal bracket to be appropriately deformed to be bent, so as to further reliably provide the effect of restraining backward displacement of the depressible portion of the operating pedal.

Further, in the second invention in which the aperture extends to bridge the bulge and the above-described upper-side portion and is provided by the triangular-shaped aperture having a base which is located along the dash panel such that the height of the triangle is increased most in the upper boundary portion of the bulge, the aperture is given a large area so that the pedal bracket can be given a light weight, while each side plate can be made to buckle with the crest portion of the bulge being displaced reliably in the outward direction. Particularly, in the third invention, since the base of the triangle defining the aperture vertically extends to lie across the crest portion of the bulge and the upper boundary portion of the bulge, the area of the aperture can be further enlarged whereby the weight of the pedal bracket can be further reduced.

BEST MODE FOR CARRYING OUT INVENTION

The present invention is advantageously applied to, for example, a brake pedal of a service braking system in which an operating rod of a brake booster is connected to a vertically intermediate portion of the operating pedal. However, the invention is equally applicable also to other operating pedal for a vehicle such as an accelerator pedal, a clutch pedal and a brake pedal of a parking braking system.

The pair of side plates of the pedal bracket are held in substantially perpendicular to the dash panel, and are given such postures that permit them to be substantially parallel with each other. The bulges are substantially symmetrically provided in portions of the respective side plates which portions are substantially the same. In a space inside the bulges, there is disposed a cylindrical member such as a component of the brake booster which is attached to the dash panel.

The vehicle body member, which serves to deform the pedal bracket through the guide member, is less likely to be displaced backwardly toward the driver's seat in the event of an impact of a large load in a direction from the vehicle front to the rear, than the dash panel. The vehicle body member is preferably provided by an instrument panel reinforcement member (i.e., member reinforcing an instrument panel of the vehicle), a cowl panel or the like. The pedal bracket is deformed to be bent according to a displacement of the dash panel relative to the vehicle body member. It is noted that the dash panel is a partition wall separating a passenger compartment and an engine room of the vehicle from each other.

The guide member is provided in one of the pedal bracket and the vehicle body member, and is slidably engaged with the other of the pedal bracket and the vehicle body member. The guide member is constructed to have a slide surface or the like, so that the upper end portion of the pedal bracket can be smoothly displaced in the downward direction, following the predetermined displacement path which is defined by the slide surface or the like of the guide member. It is appropriate that the predetermined displacement path, which is to be followed by the upper end portion of the pedal bracket, is provided by an obliquely downwardly extending straight or curved path that reliably enables the pedal bracket to be bent as a result of the displacement of the upper end portion of the pedal bracket.

The pedal bracket and the vehicle body member may be arranged such that the upper end portion of the pedal bracket and the vehicle body member are displaceable relative to each other, or alternatively, may be arranged to be connected with each other through a connecting member so that the pedal bracket is fixedly positioned relative to the vehicle body member. In the latter arrangement, the pedal bracket and the vehicle body member may be arranged to be disconnected from each other so that the pedal bracket is displaced relative to the vehicle body member, in the event of an impact of a predetermined amount of load to the pedal bracket in the direction from the vehicle front to the rear. The connecting member may be provided by a bolt or other breakable member which is breakable with an impact of a predetermined amount of load thereto, a frictional engagement member which is held in frictional engagement with a slit or the like by a bolt tightening load and which slips to be disengaged from the slit or the like with an impact of a predetermined amount of load thereto, or a deformable member which is deformable with an impact of a predetermined amount of load thereto so as to permit displacement of the upper end portion of the pedal bracket relative to the vehicle body.

The aperture is formed to be located in the region of each side plate in which at least the crest portion of the bulge is included. However, the specific position, shape and size of the aperture are suitably determined on the basis of the shapes of the pair of side plates of the pedal bracket and the direction of the load acting on the pedal bracket. That is, they are determined through simulation, experiment or the like, such that the strength of each side plate is reduced most in the crest portion of the bulge whereby each side plate can be made to buckle with the crest portion protruding outwardly.

BRIEF EXPLANATION OF DRAWINGS

[FIG. 1 (b)] A side view of the outline of construction of the brake pedal apparatus to which the present invention is applied, and showing an operating state of a pedal backward-displacement preventing device.

[FIG. 2 (b)] A front view showing in enlargement the pedal bracket of the embodiment of FIGS. 1 (a) and (b).

[FIG. 3 (b)] A front view corresponding to FIG. 2 (b), and explaining the conventional pedal bracket.

EMBODIMENT

There will be described in detail an embodiment of the present invention, with reference to the drawings.

Figure 1B:
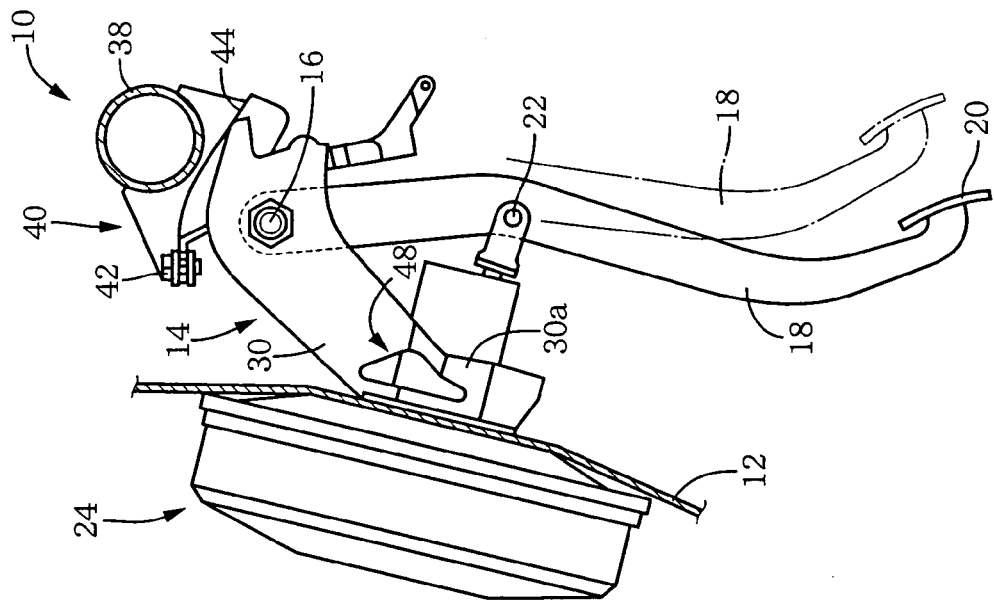
[FIG. 1 (a)] A side view of an outline of construction of a brake pedal apparatus to which the present invention is applied, and showing a usual state of the apparatus.
Figure 1A:
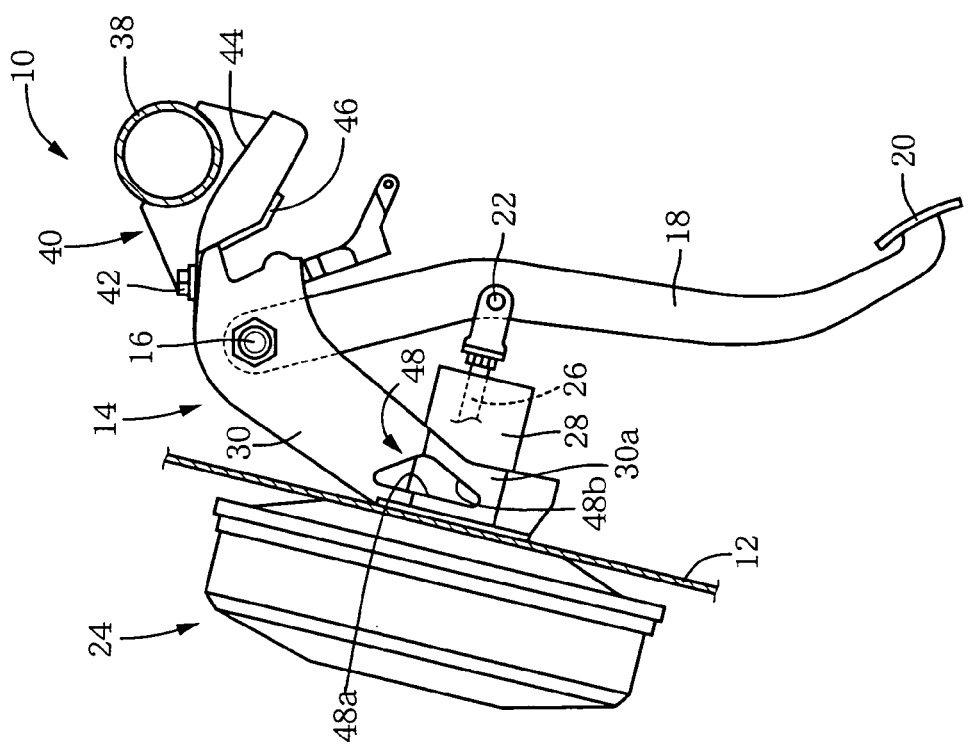

FIGS. 1 (a) and 1 (b) are schematic views showing a brake pedal apparatus 10 which is to be used for a service braking system of a vehicle and to which the present invention is applied. FIG. 1 (a) indicates a usual state of the apparatus 10, while FIG. 1 (b) indicates an operating state of a pedal backward-displacement preventing device. Each of FIGS. 1 (a) and 1 (b) is a side view of the apparatus 10 as seen from the left side of the apparatus 10. This brake pedal apparatus 10 is provided with a pedal bracket 14 which is fixedly attached through a bolt or the like (not shown) to a dash panel 12 which separates a passenger compartment and an engine room of the vehicle from each other, a support shaft 16 which is disposed in an upper portion of the pedal bracket 14 so as to extend substantially in a horizontal direction and substantially in parallel with a transversal direction of the vehicle, and an operating pedal 18 which is disposed pivotably about an axis of the support shaft 16. The operating pedal 18 is pivotably attached at its upper end portion to the support shaft 16. When a depressible portion 20 provided by a lower end portion of the operating pedal 18 is depressed in a forward direction (i.e., the leftward direction as seen in FIGS. 1 (a) and 1 (b)), an operating rod 26 of a brake booster 24 is forwardly pressed through a connecting pin 22 which connects the operating rod 26 to a vertically intermediate portion of the operating pedal 18, so that the operating pedal 18 causes the brake booster 24 to generate a braking force. The brake booster 24 is fixedly attached to the dash panel 12, and is integrally provided with a cylindrical portion 28 which is provided by, for example, a bellows. The cylindrical portion 28 of the brake booster 24 protrudes into the passenger compartment, so that the operating rod 26 extends through the cylindrical portion 28.

Figure 2A:
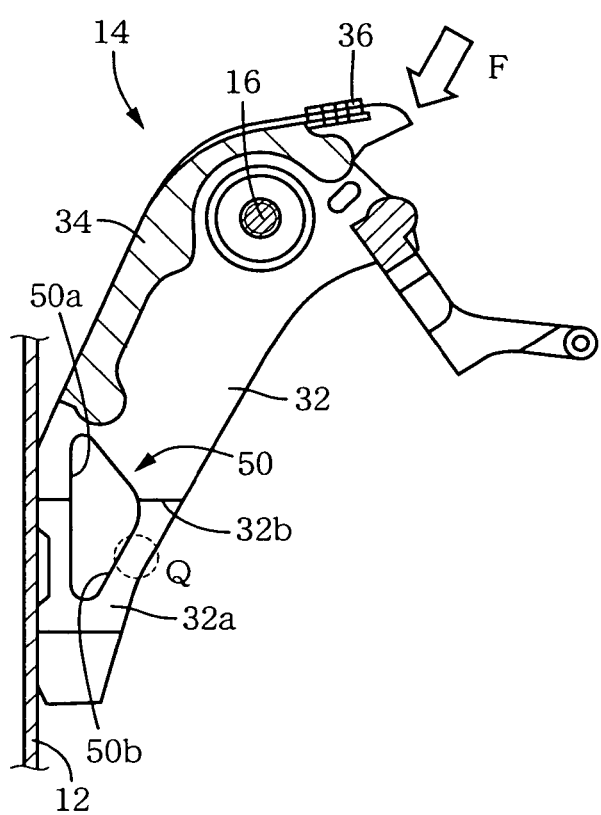
[FIG. 2 (a)] A vertical cross sectional view showing in enlargement a pedal bracket of the embodiment of FIGS. 1 (a) and (b).
Figure 2B:
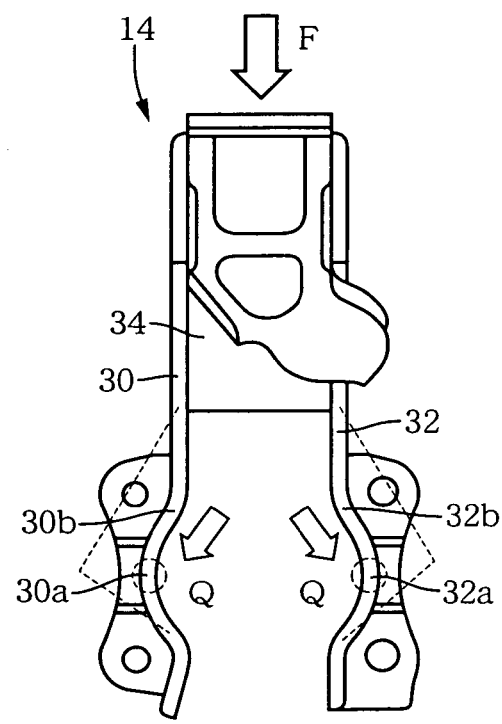
Figure 3A:
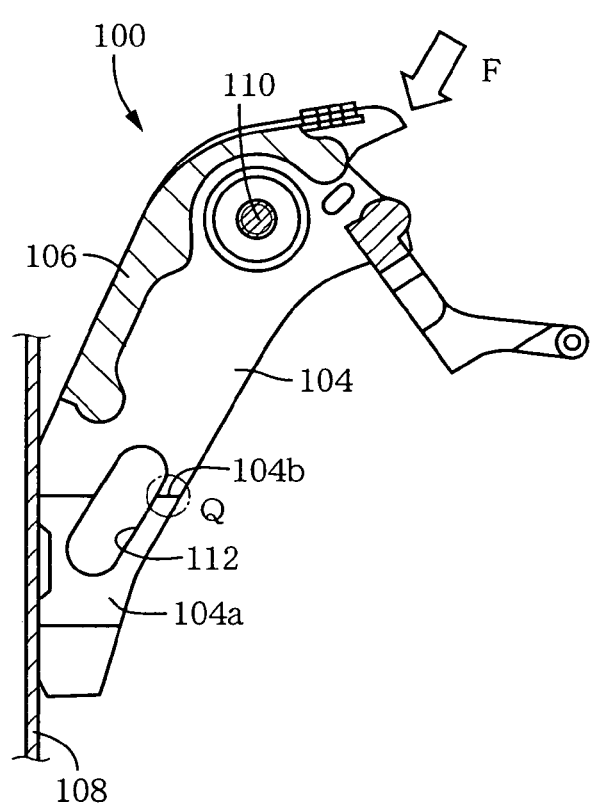
[FIG. 3 (a)] A vertical cross sectional view corresponding to FIG. 2 (a), and explaining a conventional pedal bracket.
Figure 3B:
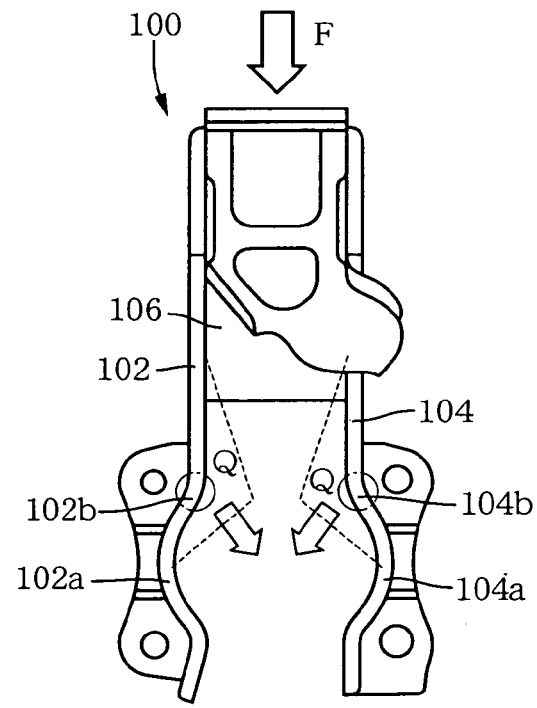

FIGS. 2 (a) and 2 (b) are views showing the above-described pedal bracket 14 in enlargement, and corresponding to FIGS. 3 (a) and (b), respectively. FIG. 2 (a) is a vertical cross sectional view of the pedal bracket 14, while FIG. 2 (b) is a front view of the pedal bracket 14. The pedal bracket 14 includes a back plate 34 and a pair of mutually opposed side plates 30, 32 which are substantially parallel with each other and which are connected to each other through the back plate 34. Thus, the pedal bracket 14 has a U-shaped cross sectional shape as a whole. The side plates 30, 32 are given such postures that permit them to be substantially perpendicular to the dash panel 12, and are positioned in the respective right and left sides of the cylindrical portion 28 of the brake booster 24. The side plates 30, 32 extend upwardly, and have respective bulges 30a, 32a provided in their respective lower portions. The bulges 30a, 32a protrude to be curved substantially symmetrically in respective rightward and leftward directions along an outer periphery of the cylindrical portion 28, such that the side plates 30, 32 do not interfere with the cylindrical portion 28. The pedal bracket 14 is fixedly attached at front ends of the respective bulges 30a, 32a (at left ends of the respective bulges 30a, 32a as seen FIG. 2 (a)), to the dash panel 12 through bolts or the like (not shown). Each of the side plates 30, 32 has a substantially constant width, and is inclined toward the rear of the vehicle so that a distance between each side plate 30, 32 and the dash panel 12 is increased as the side plates 30, 32 extend upwardly. In upper portions of the respective side plates 30, 32, the above-described support shaft 16 is provided to connect the side plates 30, 32.

A connecting member 36 is fixedly provided in an upper end portion of the pedal bracket 14, and is connected through a bolt 42 to a support member 40 which is fixedly attached to an instrument panel reinforcement member 38 as a vehicle body member, as shown in FIG. 1. The bolt 42 is introduced in a slit which is formed in the connecting member 36, and is held in frictional engagement, by a screw tightening, with portions of the connecting member 36 which are located on opposite sides of the slit, whereby the pedal bracket 14 is connected to the support member 40. When a predetermined amount of disengaging force is applied to the pedal bracket 14 in a direction from the vehicle front to the rear, i.e., in the rightward direction as seen in FIGS. 1 (a) and 1 (b), the connecting member 36 is made to slip to cause the bolt 42 to be disengaged from the above-described portions of the connecting member 36 which are located on the opposite sides of the slit, whereby the bolt 42 is removed from the connecting member 36. The pedal bracket 14 and the support member 40 are thus disconnected from each other, as shown in FIG. 1 (b).

The above-described predetermined amount of disengaging force corresponds to such an amount that allows the upper end portion of the pedal bracket 14 to be removed from the support member 40, for preventing the depressible portion 20 of the operating pedal 18 from being displaced toward a driver's seat of the vehicle, in the event of displacement of the dash panel 12 toward the driver's seat which displacement is caused, for example, due to application of a large load thereto in the direction from the vehicle front to the rear. Two kinds of guide members 44, 46 are provided in fixedly provided in the support member 40. Each of the guide members 44, 46 is smoothly inclined in the obliquely downward direction as the guide members 44, 46 extend toward the rear of the vehicle, i.e., toward the driver's seat. When the pedal bracket 14 is disconnected from the support member 40 and is further displaced together with the dash panel 12 toward the driver's seat, the pedal bracket 14 is brought into slidable engagement at its upper end portion with a slide surface (lower surface) of the guide member 44. The pedal bracket 14 is then guided by the guide member 44 so as to be smoothly displaced in the obliquely downward direction. The instrument panel reinforcement member 38 which is provided with the support member 40 is less likely to be displaced toward the rear of the vehicle in the event of an impact of a large load in the direction from the vehicle front to the rear, than the dash panel 12. Owing to the displacement of the dash panel 12 and the instrument panel reinforcement member 38 relative to each other, the upper end portion of the pedal bracket 14 is removed from the support member 40, and is then guided by the guide member 44 so as to be smoothly displaced in the obliquely downward direction. The guide member 46 is integrally provided in the support member 44, and serves to position the pedal bracket 14, for preventing the pedal bracket 14 from being deviated from the slide surface of the guide member 44 to any one of opposite sides of the slide surface, even in presence of a load acting on the pedal bracket 14 in an oblique direction.

In a crest portion of each of the bulges 30a, 32a of the respective side plates 30, 32, there is located a weakest portion Q at which a strength against a load F (exerted by the guide member 44 when the upper end portion of the pedal bracket 14 is displaced in the oblique downward direction) is weakened most. The side plates 30, 32 have respective apertures 48, 50 each of which is located in a region of a corresponding one of the side plates 30, 32 which region includes the crest portion of a corresponding one of the bulges 30a, 32a, such that each of the side plates 30, 32 can buckle with the crest portion being made to protrude outwardly, as indicated by broken line in FIG. 2 (b). The position and shape of each of the apertures 48, 50 are suitably determined on the basis of the shapes of the pair of side plates 30, 32 of the pedal bracket 14 and the direction of the load F acting on the pedal bracket 14. That is, they are determined through simulation, experiment or the like, such that each of the side plates 30, 32 can buckle with the crest portion being made to protrude outwardly. In the present embodiment, each of the apertures 48, 50 extends to bridge the bulge and a portion of the corresponding side plate 30, 32 which portion is located on an upper side of the bulge, and has a triangular shape. The triangular-shaped apertures 48, 50 have respective bases 48a, 50a which are substantially parallel with the dash panel 12. Vertexes of a triangle defining each of the apertures 48, 50 are given smooth arcuate shapes. Each of the bases 48a, 50a vertically extends to lie astride the crest portion and an upper boundary portion 30b, 32b of the bulge 30a, 32a of the side plate 30, 32. A top of the triangle opposite to the base 48a, 50a is positioned in the upper boundary portion 30b, 32b. In other words, a height of the triangle as measured from the base 48a, 50a is increased most in the upper boundary portion 30b, 32b. Described more specifically, the top of the triangle is positioned, namely, the height of the triangle is increased most in a position which is slightly lower than a center of the upper boundary portion 30b, 32b. A lower one 48b, 50b of two sides adjacent to the base 48a, 50a is inclined so as to be substantially parallel to a rear end of the side plate 30, 32 as viewed in a vehicle running direction, namely, so as to be substantially parallel to a right end of the side plate 30, 32 as seen in FIGS. 1 (a) and 2 (a).

As is apparent from FIG. 2 (a), each of the above-described apertures 48, 50 is given a triangular shape as seen in a side view of the pedal bracket 14, in an eventual product state in which the bulge 30a, 32a has been formed in the side plate 30, 32 by a pressing operation. Since each of the bulges 30a, 32a is made to protrude by a small amount, the triangle shape shown in FIG. 2 (a) is substantially the same as a triangle shape of each aperture 48, 50 in a state before the pressing operation.

With the pair of side plates 30, 32 being made to buckle in the vicinity of the bulges 30a, 32a, the pedal bracket 14 as a whole is deformed to be bent at its portion corresponding to the bulges 30a, 32a so as to appear to make a bow. As a result of the bending deformation of the pedal bracket 14, the operating pedal 18 connected at its upper end portion to the support shaft 16 is clockwise pivoted (as seen in FIGS.

1 (*a*) and 1 (*b*)) about a fulcrum in the form of the intermediate portion of the operating pedal 18 at which the operating pedal 18 is connected (through the connecting pin 22). With the operating pedal 18 being clockwise pivoted about its intermediate portion, the depressible portion 20 of the operating pedal 18 is relatively displaced in a direction toward the front of the vehicle (i.e., in the leftward direction as seen FIG. 1 (*b*)). Thus, the depressible portion 20 is restrained from being backwardly displaced toward the driver's seat. That is, as a result of the bending deformation of the pedal bracket 14, the depressible portion 20 of the operating pedal 18 is displaced toward the front of the vehicle, as indicated by solid line in FIG. 1 (*b*). It is noted that one-dot chain line of FIG. 1 (*b*) indicates a posture of the operating pedal 18 in a case where the depressible portion 20 of the operating pedal 18 is displaced backwardly without the pedal bracket 14 being deformed. In the present embodiment, the pedal backward-displacement preventing device is constructed to include the connecting member 36, the bolt 42, the guide member 44 and the apertures 48, 50.

In the present embodiment, each of the apertures 49, 50 is provided in the region of a corresponding one of the side plates 30, 32 in which region a corresponding one of the bulges 30*a*, 32*a* is provided, such that the strength of the side plate 30, 32 is weakened most (against the load F) in the crest portion of the bulge 30*a*, 32*a*. Therefore, each side plate 30, 32 buckles with the crest portion of the bulge 30*a*, 32*a* being made to protrude outwardly, as a result of the bending deformation of the pedal bracket 14 caused by the load F which is generated due to the displacement of the dash panel 12 toward the driver's seat in the event of an impact of a large load in the direction from the vehicle front to the rear. In this instance, since the crest portions of the respective bulges 30*a*, 32*a* are thus made to buckle to protrude outwardly, the side plates 30, 32 are unlikely to interfere with the cylindrical portion 28 of the brake booster 24 which is located inside the bulges 30*a*, 32*a* of the side plates 30, 32. Even if the side plates 30, 32 interfere with the cylindrical portion 28, the buckle deformation of the pedal bracket 14 is less likely to be impeded than where the side plates are bent with the upper boundary portions 30*b*, 32*b* of the respective bulges being made to protrude inwardly. It is therefore possible to constantly enable the pedal bracket 14 to be appropriately deformed to be bent, thereby further reliably providing the effect of restraining backward displacement of the depressible portion 20 of the operating pedal 18.

Further, in the present embodiment, each aperture 48, 50 extends to bridge the bulge 30*a*, 32*a* and a portion of the side plate 30, 32 which portion is located on an upper side of the bulge 30*a*, 32*a*, while being provided by the triangular-shaped aperture. Each triangular-shaped aperture 48, 50 has the base 48*a*, 50*a* which is substantially parallel with the dash panel 12, and the lower side 48*b*, 50*b* which is substantially parallel with the rear end of the side plate 30, 32. The height of the triangle defining the aperture 48, 50 is increased most in the upper boundary portion 30*b*, 32*b* of the bulge 30*a*, 32*a*, so that the side plate 30, 32 can be made to buckle with the crest portion of the bulge 30*a*, 32*a* being displaced reliably in the outward direction, while the aperture 48, 50 is given such a large area that the pedal bracket 14 can be given a light weight. Particularly, since the base 48*a*, 50*a* of the triangle defining the aperture 48, 50 vertically extends to lie across the crest portion of the bulge 30*a*, 32*a* and the upper boundary portion 30*b*, 32*b* of the bulge 30*a*, 32*a*, the area of the aperture 48, 50 can be further enlarged whereby the weight of the pedal bracket 14 can be further reduced.

The embodiment of the present invention has been explained in detail with reference to the drawings. However, the explained embodiment is merely an embodied form, and the present invention can be embodied with various modifications and improvements on the basis of knowledge of those skilled in the art.

The invention claimed is:

1. A vehicle-pedal backward-displacement preventing device for a vehicle having a driver's seat, a vehicle body member, and a dash panel, which is displaceable relative to the vehicle body member in the event of backward displacement of the dash panel toward the driver's seat, said device comprising:

a pedal bracket having a pair of mutually opposed side plates each including (i) a front end at which said pedal bracket is attached to the dash panel and (ii) a bulge which protrudes in a protruding direction away from the other of said plates;

an operating pedal disposed pivotably about an axis of a support shaft connecting said side plates, and having a depressible portion which is provided by a lower end portion thereof to be depressed; and a guide member disposed in relation to an upper end portion of said pedal bracket and the vehicle body member, and restraining said depressible portion of said operating pedal from being backwardly displaced toward the driver's seat, upon backward displacement of said pedal bracket together with the dash panel toward the driver's seat;

wherein said guide member is configured to cause said upper end portion of said pedal bracket to be downwardly displaced following a predetermined displacement path, upon displacement of said pedal bracket relative to the vehicle body member, and causes said pedal bracket to be deformed with said side plates being made to buckle;

and wherein each of said side plates has an aperture located in a region thereof which includes a crest portion of said bulge, such that a strength of each of said side plates against a load, which is exerted by said guide member upon the backward displacement of the dash panel, is made smaller in said crest portion than in the other portion of each of said side plates, so that each of said side plates can be made to buckle with said crest portion of said bulge being displaced in said protruding direction.

2. The vehicle-pedal-backward-displacement preventing device according to claim 1:

wherein said operating pedal is a brake pedal connected to an operating rod of a brake booster which is disposed on the dash panel;

wherein said side plates are disposed on opposite sides of the brake booster;

wherein said bulge is located in a respective lower portion of each of said side plates, and protrudes in said protruding direction so as to prevent interference of said side plates with the brake booster;

wherein said bulge has a front end which is attached to the dash panel, and a rear end which is inclined with respect to the dash panel to be spaced away from the dash panel as the rear end extends upwardly;

wherein said aperture extends to bridge said bulge and a portion of a corresponding one of said side plates which is located on an upper side of said bulge;

and wherein said aperture is defined by a triangle such that a base of said triangle extends along the dash panel and such that said triangle peaks in an upper boundary portion of said bulge.

3. The vehicle-pedal-backward-displacement preventing device according to claim 2;

wherein said bulge of one of said side plates and said bulge of the other of said side plates are located on opposite sides of a cylindrical portion of the brake booster through which the operating rod extends;

and wherein said bulge of each of said side plates is curved along an outer periphery of the cylindrical portion of the brake booster, so as to protrude in said protruding direction.

4. The vehicle-pedal-backward-displacement preventing device according to claim 2, wherein said base of said triangle defining said aperture extends vertically to lie across said crest portion and said upper boundary portion of said bulge.

5. The vehicle-pedal-backward-displacement preventing device according to claim 1, wherein said guide member is related to an instrument panel reinforcement member of the vehicle as the vehicle body member.

6. The vehicle-pedal-backward-displacement preventing device according to claim 1, further comprising a connecting member connecting said pedal bracket and a support member which is fixed to the vehicle body member;

wherein said connecting member is fixed to said upper end portion of said pedal bracket, and is slidably engaged with said support member;

and wherein said connecting member is disengageable from said support member, upon the backward displacement of said pedal bracket toward the driver's seat.

7. The vehicle-pedal-backward-displacement preventing device according to claim 6;

wherein said guide member is provided by a portion of said support member, and has a slide surface which defines said predetermined displacement path;

and wherein said slide surface of said guide member is inclined such that a height thereof is reduced as viewed in a direction away from a front of the vehicle toward a rear of the vehicle.

8. The vehicle-pedal-backward-displacement preventing device according to claim 7, wherein said operating pedal is a brake pedal connected at an intermediate portion thereof to an operating rod of a brake booster which is disposed on the dash panel, such that said brake pedal is pivotable about said intermediate portion thereof, in such a direction that causes said depressible portion thereof to be displaced toward the front of the vehicle relative to said intermediate portion, upon displacement of said upper end portion of said pedal bracket following said predetermined displacement path which is defined by said slide surface of said guide member.

* * * * *